Patented Mar. 17, 1936

2,034,449

UNITED STATES PATENT OFFICE 2,034,449

SEED DISINFECTANT

Frederick Lawrence Sharp, Blackley, Manchester, England, assignor to Imperial Chemical Industries Limited, a corporation of Great Britain No Drawing. Application July 28, 1933, Serial No. 682,725. In Great Britain August 3, 1932

5 Claims. (Cl. 167—38)

This invention relates to seed disinfectants and more particularly to the manufacture of dry seed disinfectants.

Seed disinfectants are broadly of two types, those particularly adapted for application in solution and those suitable for application in the dry condition. Each of these types has its advantages and disadvantages. In the case of the dry disinfectants some of the disadvantages are that in application they may give rise to dust injurious to the laborers, that they may not adhere sufficiently to the seed or, if they do adhere, they may impede the flow from the drilling machines as compared with untreated seeds.

It is an object of this invention to provide a treatment for dry seed disinfectants which will overcome many of the objectionable characteristics of these disinfectants. Another object is to provide a treated dry disinfectant which will not exclude moisture, and so interfere with or prevent germination of seeds to which it is applied. Other objects will appear hereinafter.

These objects are accomplished by the following invention in which a mixture of oleaginous substances such as wool fat and olive oil or wool fat and petrolatum which has the capacity to absorb several times its weight of water, is used as the anti-dusting agent. The petrolatum or olive oil is added to the wool-fat to act as lubricant for treated seeds and so prevent clogging of seed handling and distributing machinery. While wool fat is specifically mentioned it is not intended to disclaim for my purpose other fatty materials of a highly water absorbent nature. The above mixture is incorporated by suitable means, for example by milling, into a seed disinfectant dust. While various dry seed disinfectants may be used with my anti-dusting composition, I have found by experiments that my moisture absorbing fatty mixtures are particularly well adapted for use with the type of seed disinfectants comprising the aryl mercuri acetates, e. g., phenyl or tolyl mercuri acetate diluted with talc or other suitable agent.

The following example illustrates, but does not limit my invention. The parts are by weight.

Example 2-3 parts tolyl mercuri acetate, 5 parts of a mixture consisting of 20 parts olive oil and 80 parts wool fat, and 92-93 parts talc are thoroughly mixed together and tinted if necessary by the incorporation of a small amount of a suitable pigment such as iron oxide. It is applied in the dry condition in any convenient manner to the seeds or tubers to be treated.

The proportion of wool fat-olive oil or similar mixture may be varied, but a suitable proportion is 5% based on the weight of the diluted toxic agent.

By thus incorporating the wool fat-olive oil mixture the tendency of the seed disinfectant to dust is greatly reduced or even entirely prevented, a good adherence of the dust to the seed is secured and the treated seed flows from the drilling machine at approximately the same rate as the untreated seed and thus its even distribution by means of such machines is not affected. Further, the wool fat content of the treated seeds is of value since its water absorbing properties assist in or at least reduce inhibition of the germination of the seeds, tubers or the like to which it is applied.

As many apparently widely different embodiments of this invention may be made without departing from the spirit and scope thereof, it is to be understood that I do not intend to limit myself to the specific embodiments thereof except as indicated in the appended claims.

I claim:

1. A dry non-dusting seed disinfectant having its particles coated with a major portion of wool fat and a minor portion of olive oil whereby dusting is prevented without rendering the coated particles water-repellant.

2. A dry non-dusting seed disinfectant comprising an aryl mercuric acetate and a dry powdered inert diluent coated with a mixture of a major portion of wool fat and a minor portion of olive oil to prevent dusting without rendering the coated particles water-repellant..

3. A dry non-dusting seed disinfectant comprising 2-3 parts of tolyl mercuric acetate and 92-93 parts of talc coated with 5 parts of a mixture of 20 parts of olive oil and 80 parts of wool fat to prevent dusting without rendering the coated particles water-repellant.

4. A dry non-dusting seed disinfectant having its particles coated with a mixture of a major portion of wool fat and a minor portion of petrolatum to prevent dusting without rendering the coated particles water-repellant.

5. A dry non-dusting seed disinfectant having its particles coated with a mixture of a major portion of wool fat and a minor portion of an oleaginous material selected from a group consisting of olive oil and petrolatum.

FREDERICK LAWRENCE SHARP.